(12) United States Patent
Vaidya et al.

(10) Patent No.: US 12,287,079 B2
(45) Date of Patent: Apr. 29, 2025

(54) SYSTEM AND METHOD OF RECYCLING LIGHT IN HOME/STORE/COMMERCIAL AND STREET LIGHT FIXTURES

(71) Applicants: Bansi Pranav Vaidya, Calgary (CA); Pranav Jagadishchandra Vaidya, Calgary (CA)

(72) Inventors: Bansi Pranav Vaidya, Calgary (CA); Pranav Jagadishchandra Vaidya, Calgary (CA)

( * ) Notice: Subject to any disclaimer, the term of this patent is extended or adjusted under 35 U.S.C. 154(b) by 0 days.

(21) Appl. No.: 18/264,323

(22) PCT Filed: Dec. 9, 2022

(86) PCT No.: PCT/CA2022/051807
§ 371 (c)(1),
(2) Date: Aug. 4, 2023

(87) PCT Pub. No.: WO2023/108263
PCT Pub. Date: Jun. 22, 2023

(65) Prior Publication Data
US 2024/0410541 A1 Dec. 12, 2024

Related U.S. Application Data

(60) Provisional application No. 63/291,400, filed on Dec. 19, 2023.

(51) Int. Cl.
*F21S 9/03* (2006.01)
*F21V 23/00* (2015.01)
(Continued)

(52) U.S. Cl.
CPC ............ *F21S 9/037* (2013.01); *F21V 23/003* (2013.01); *G16Y 40/10* (2020.01); *G16Y 40/20* (2020.01);
(Continued)

(58) Field of Classification Search
CPC .......... F21S 9/037; H02S 10/10; H02S 10/20; H02S 20/20; H02S 40/38; F21V 23/003;
(Continued)

(56) References Cited

U.S. PATENT DOCUMENTS 6,948,826 B2 9/2005 Fogerlie
7,988,320 B2 8/2011 Brumels
(Continued)

FOREIGN PATENT DOCUMENTS

CN 101377279 A 3/2009
CN 203166801 U 8/2013
(Continued)

OTHER PUBLICATIONS

Park/Jung Espacenet Bibliographic data: KR20200053721A, May 19, 2020 (Year: 2020).*
(Continued)

*Primary Examiner* — Alan B Cariaso
(74) *Attorney, Agent, or Firm* — Brunet & Co. Ltd.; Robert Brunet; Hans Koenig

(57) ABSTRACT

The embodiments herein disclose a system and method for recycling light in home/store/commercial buildings and streetlight fixtures. In an embodiment, the principle of recycling (or harvesting) light is mainly by designing a special recycling light fixture or by retrofitting existing light fixtures. The recycling light fixture has a lining plurality of photovoltaic cells which captures the light emitted by the plurality of light emitting devices in the recycling light fixture itself. The recycling light fixture includes the plurality of light emitting devices comprising light bulb/LED that emits light in all directions. The recycling light fixture includes a structure that captures the light emitted towards the fixture (the ceiling), generates electricity using the plurality of photovoltaic cell and feeds it back into the same
(Continued)

recycling light fixture itself, thereby recycling the unused light and reducing the power consumption from the power grid.

13 Claims, 7 Drawing Sheets

(51) Int. Cl.
*G16Y 40/10* (2020.01)
*G16Y 40/20* (2020.01)
*H02S 10/10* (2014.01)
*H02S 10/20* (2014.01)
*H02S 20/20* (2014.01)
*H02S 40/38* (2014.01)
*H05B 45/30* (2020.01)

(52) U.S. Cl.
CPC .............. *H02S 10/10* (2014.12); *H02S 40/38* (2014.12); *H05B 45/30* (2020.01); *H02S 10/20* (2014.12); *H02S 20/20* (2014.12); *Y02B 10/10* (2013.01); *Y02B 20/72* (2013.01)

(58) Field of Classification Search
CPC ........ G16Y 40/10; G16Y 40/20; Y02B 10/10; Y02B 20/72; H05B 45/30
See application file for complete search history.

(56) References Cited

U.S. PATENT DOCUMENTS

| | | | |
|---|---|---|---|
| 8,633,372 B2 | 1/2014 | Rouda | |
| 8,721,109 B2 | 5/2014 | Lin | |
| 9,402,285 B2 | 7/2016 | Bond | |
| 9,768,461 B2 | 9/2017 | Salmond et al. | |
| 10,242,562 B2 * | 3/2019 | Steinmetz | ............... H04W 4/80 |
| 11,251,316 B2 | 2/2022 | Harris et al. | |
| 2010/0096000 A1 | 4/2010 | Andrade | |
| 2010/0328930 A1 | 12/2010 | Wu et al. | |
| 2011/0090678 A1 | 4/2011 | Saluccio | |
| 2014/0022772 A1 | 1/2014 | Lin | |
| 2014/0168957 A1 | 6/2014 | Taft | |
| 2014/0306645 A1 | 10/2014 | Salmond et al. | |
| 2021/0408966 A1 * | 12/2021 | St James | ............... H10K 30/352 |

FOREIGN PATENT DOCUMENTS

| | | | | |
|---|---|---|---|---|
| CN | 103296926 A | | 9/2013 | |
| CN | 207018917 U | | 2/2016 | |
| CN | 211019359 U | | 7/2020 | |
| CN | 215259543 U | | 12/2021 | |
| EP | 3597985 A1 | * | 1/2020 | ............. B65D 65/18 |
| KR | 20200053721 A | * | 5/2020 | ............. H02S 40/38 |
| WO | 2020081142 A1 | | 4/2020 | |
| WO | 2023/108263 A1 | | 6/2023 | |

OTHER PUBLICATIONS

Description KR20200053721A, EPO Patent Translate, pp. 1-51. (Year: 2020).*
Christie L. Cutting; Monojit Bag‡a; D. Venkataraman; Indoor Light Recycling: A New Home for Organic Photovoltaics; J. Mater. Chem. C; Oct. 20, 2016; vol. 4; pp. 10367-10370.
Xinyu Ma; Sebastian Bader; Bengt Oelmann; Power Estimation for Indoor Light Energy Harvesting Systems; IEEE; Oct. 10, 2020; vol. 69; pp. 7513-7521; Sweden.
Mario Vincenzo La Rocca; Recovering Energy From Artificial Light : Indoor Solar Panels; The patent Invention Magazine; Sep. 30, 2019.
Arij Limam; Scientists Develop Solar Cells That Harvest Energy From Indoor Light; CGTN; Nov. 23, 2020; Europe.
International Journal of Simulation: Systems, Science & Technology; Modelling of Indoor Light Energy Harvesting for Iot; researchgate. net; May 19, 2003; 19(5;) pp. 3.1-3.5; Malaysia.
CSIR, Government of India; Solar Cells That Harvest Indoor Light to Produce Energy; Council of Scientific & Industrial Research; Ministry of Science & Technology, Govt. of India; Oct. 2019.
International Search Report and Written Opinion dated Mar. 14, 2023 on PCT/CA2022/051807.

* cited by examiner

Integrated Legos style LEDs and PV Cells

SYSTEM AND METHOD OF RECYCLING LIGHT IN HOME/STORE/COMMERCIAL AND STREET LIGHT FIXTURES

CROSS-REFERENCE TO RELATED APPLICATIONS

This application is a national entry of PCT/CA2022/051807 filed Dec. 9, 2022, which claims the priority to and the benefit of the Provisional Patent Application (PPA) filed in the United States Patent and Trademark Office (USPTO) on Dec. 19, 2021, with the serial number U.S. 63/291,400 and title, "SYSTEM AND METHOD OF RECYCLING LIGHT IN HOME/STORE/COMMERCIAL AND STREET LIGHT FIXTURES", the contents of both of which are herein incorporated by reference in their entirety.

BACKGROUND

Technical Field

The embodiments herein are generally related to a light fixture or a light source device. The embodiments herein are particularly related to a system and method for reducing power consumption. The embodiments herein are more particularly related to a system and method for recycling (harvesting) light in a home/store/commercial and streetlight fixture thereby reducing power consumption and reducing Greenhouse Gas (CHG) emission and carbon tax.

Description of the Related Art

Various existing methods and techniques are used for supplying power to a light fixture using fossil fuels such as coal natural gas and then there are other sources such as Nuclear, Hydro solar and wind source. However, there is limitation to these approaches such as: availability of the coal and natural gas is not available everywhere. Hydro and nuclear power generation is also not available in certain geographical locations and not suitable because of safety concerns. The solar and wind power generations are inconsistent and require large battery storage infrastructure which are both expensive and require significant amount of space for installation. Moreover, the battery production also generates significant amount of greenhouse gas (GHG) emissions. When the battery life is over, the battery cannot be recycled (harvested) easily, and they are toxic in nature.

The existing devices disclose an energy-saving device powered through light source feedback. The energy-saving device powered by light source feedback comprise of AC conversion and switching control modules, a photovoltaic power generating module, a charging and energy-storing module, a variable frequency inverter module, a switching and detecting module, and a light energy converter plate. The energy-saving device powered through the light source feedback is mainly used in the industrial lighting device, in which the light energy generated by aging lanterns such as tube lights and bulbs is reused. The light energy output by the aging lanterns is converted through the light energy converter plate and then is stored through the charging and energy storing module. The Direct Current is converted into alternative current (AC) through the variable frequency inverting module. The converted AC is supplied to the energy-saving device under the control of the AC conversion and switching control module. The currently available PV cells are unable to produce electricity to power the very source of the light.

None of the existing devices are modular in nature and are not used to power the same source of light. The light source and the PV cells are not an integral part of the same fixture. The PV cells are assumed to be mounted in proximity of the light source either on a ceiling or a wall thereby greatly reducing the power generation using PV cells. Further there will be power losses due to cabling of PV power to lighting fixtures. Still further the existing devices disclose the conversion of PV power to AC which itself introduces losses and lowers efficiency of the light recycling mechanism.

With the currently available PV cells, it is not possible to produce electricity to power the very source of the light. Further the usage of battery for saving and supplying power to the lighting fixtures has its own limitations because the batteries have limited life and need to be replaced. Further the batteries tend to leak current. The other limitation of the PV cells is the shape and size of the photovoltaic cells. There is a need to modify the shapes of these PV cells to fit different types of fixtures. All of the prior arts do not address the use of plastic, the GHG emissions and the efficiency of the PV and light bulbs itself.

Hence there is a need for developing a system and method for using/tapping the unused light luminescence to generate power which is fed back into the lighting device to reduce power consumption and thereby reducing GHG emission, reducing environmental impact, creating jobs, and reducing the carbon tax.

The above-mentioned shortcomings, disadvantages and problems are addressed herein, and which will be understood by reading and studying the following specification.

OBJECTIVES OF THE EMBODIMENTS HEREIN

The principal objective of the embodiments herein is to provide a system and method of recycling light in home/store/commercial and street-light fixtures.

Another objective of the embodiments herein is to reduce power consumption and GHG emission, thereby reducing power and carbon tax bills and environment impact of global warming and pollution.

Yet another objective of this embodiment here in is to help provide lower cost lighting power to rural areas, economically challenged geographical areas especially where the transmission losses can be heavy because of the remoteness.

Yet another objective of the embodiments herein is to reduce the power consumption without compromising the quality and level of light illuminating an area. The recycling light is configured to work with any environment.

Yet another objective of the embodiments herein is to provide a system and method for recycling light in different geographical regions and, regardless of a local power grid the voltage levels and the AC cycle frequency.

Yet another objective of the embodiments herein is to provide a system and method for recycling light in a more efficient manner by providing a recycling mechanism integrated in the same light source, and by using only the unused light and not blocking the usable light.

Yet another objective of the embodiments herein is to provide a system and method for recycling light in which the power produced is used or fed back to the same lighting device itself thereby eliminating the need for power conversion and avoiding transmission losses.

Yet another objective of the embodiments herein is to provide a system and method for recycling light in which a need for battery storage, power loss due to battery and battery degradation over time is reduced or eliminated.

Yet another objective of the embodiments herein is to provide a system and method for recycling light in which capacitors are provided to store power.

Yet another objective of the embodiments herein is to provide a system and method for recycling light with or without a protective dome cover.

Yet another objective of the embodiments herein is to provide a system and method for recycling light which is very much efficient, cost-effective, and easy to retrofit using Lego style modular design and of course easier to maintain.

Yet another objective of the embodiments herein is to provide a light recycling and feedback mechanism to produce power when the light source is switched on. The light recycling and feedback mechanism is fitted into the existing fixtures and locations. The light recycling and feedback mechanism does not occupy additional space. In the light recycling and feedback mechanism, most of the light falling on the PV cells is perpendicular there by providing maximum efficiency Yet another objective of the embodiments herein is to automatically measure power consumption of every light fixture and sense/detect power from the recycled light, thereby minimizing/reducing power consumption from utility source while maximizing power consumption from the recycled light.

Yet another objective of the embodiments herein is to provide a system and method for recycling light which is operated at any voltage and AC cycles frequency that are used globally.

Yet another objective of the embodiments herein is to provide a system in which the light fixture is less susceptible to dust and other inclement weather conditions as the light flux collecting mechanism is installed inside the fixture and away from human and other traffic.

Yet another objective of the embodiments herein is to provide the light recycling and feedback mechanism that is hooked up to the internet utilizing power line communication method to eliminate the need for Wi-Fi, which eventually helps in reducing communication related power consumption. The light recycling and feedback mechanism is connected to the internet to check utility rates and provide accurate power savings.

Yet another objective of the embodiments herein is to provide the light recycling and feedback mechanism that is hooked up to the internet utilizing power line communication method to eliminate the need for Wi-Fi, which eventually helps in reducing communication related power consumption.

Yet another object of the embodiments herein is to provide the light recycling and feedback mechanism that is connected to the internet to check source of utility fossil fuel to provide accurate GHG savings and carbon tax savings. Also, the system is used to monitor utility rates and provide accurate savings because of the power generated from the recycled light.

Yet another objective of the embodiments herein is to provide the light recycling and feedback mechanism for monitoring a condition of the PV cells and the power generated from recycled light to provide a warning/alert to the user in case of a PV cell efficiency degradation, thereby helping in maintaining the level of power generated from the recycled light at all the times.

Yet another objective of the embodiments herein is to provide the light recycling and feedback mechanism that is installed in any region of the world without any modification/alteration, as the system is operated at any voltage and AC cycle frequencies. The modular PV cell design eliminates a need for modifications for installing/mounting into different types of fixtures globally.

Yet another objective of the embodiment here is to provide Microprocessor/Microcontroller based IoT and data analytics, which allows for tracking the electrical parameters such as voltage, amperage and based on that to determine the total savings because of recycled light.

Yet another object of the embodiment herein is to provide an IoT technology to collect information and archive information for data analytics and accurate GHG calculations: accurately monitor the power generated and consumed from the recycled light, from battery/capacitor if any and the grid; and monitor the LED and PV efficiencies for further data analysis and to help improve both the LEDs and the PV cell technologies.

These and other objectives and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objectives and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This Summary is provided to introduce a selection of concepts in a simplified form that is further described below in the Detailed Description. This Summary is not intended to identify key or essential features of the claimed subject matter, nor is it intended to be used as an aid in determining the scope of the claimed subject matter.

The various embodiments herein provide a system and method for recycling light at home, store, commercial buildings, and street-light fixtures. In an embodiment, the principle of recycling (or harvesting) light is mainly by designing a special recycling light fixture, (or retrofitting existing fixtures using Lego style modular design), wherein the light fixture has a lining of Photovoltaic cells which captures the light being emitted by the light source in the fixture itself. Typically, the light fixture includes a light emitting device such as bulb or LEDSs that emits light in all directions. However, the light that is emitted towards the fixture (the ceiling) as well as the light reflected back from the fixture cover, or the dome is wasted for the most part. So, the light fixture further includes a structure that captures this light, generates electricity using photovoltaic cell and feeds it back into the same light bulbs. The unused light is recycled, and thereby reducing the power consumption from the power grid. Hence, the recycle light structure is used in homes store, commercial buildings, or street-light fixtures.

According to one embodiment herein, a system for recycling light at home, store, commercial buildings, and streetlight fixtures is provided. The system comprises a recycling light fixture comprising a plurality of light emitting devices configured to emit light in all directions, a lining of plurality of photovoltaic cells (PV cells) configured to capture the light being emitted by the plurality of light emitting devices to generate electricity, and to power the plurality of light emitting devices itself. The lining of the plurality of photovoltaic cells are provided for the plurality of light emitting devices such as bulbs or LED lamps. Furthermore, the recycling light fixture comprises a light base covered by an outer frame, and the light base includes the plurality of photovoltaic cells (PV cells). Moreover, the outer frame is configured to be designed with or without a protective dome cover. The system further comprises a power summation circuit coupled to a power grid configured to receive the power generated by the plurality of photovoltaic cells embedded on the recycling light fixture. The power summation circuit adds the power from the power grid and the recycled power from the plurality of photovoltaic cells to supply the power to the plurality of light emitting devices itself. The plurality of light emitting devices includes bulbs or LED lamps.

According to one embodiment herein, the recycling light fixture is configured to be retrofitted to the existing light fixtures in Lego style or Jigsaw style modular design as per the size, shape, and luminescence requirements. The shape and size of the plurality of PV cells, the light base and the outer frame are selected based on the style and wattage of the plurality of light emitting devices. Furthermore, the recycling light fixture helps to utilize an unused light emitted by the plurality of light emitting devices, which is recycled to produce electricity and to reduce the power consumption from the utility power grid.

According to one embodiment herein, the system eliminates a usage of battery, as all the power generated by the recycling light fixture using the plurality of PV cells is utilized completely to power the plurality of light emitting devices itself. Furthermore, the system utilizes a capacitor to hold a charge instead of a battery when there is a need to store power while the plurality of PV cells generates power during daytime.

According to one embodiment herein, the amount of recycled power generated by the recycling light fixture with the protective dome cover is 29% and the amount of recycled power generated by the recycling light fixture without the protective dome cover is 18.3%. In the recycling light fixture without the protective dome cover, the amount of light and the photon energy reflected back to the ceiling are much lower. Hence an amount of the recycled power generated is less. In the recycling light fixture with the protective dome cover, the amount of light and photons reflected back to the celling where the integrated plurality of PV cells and the plurality of light emitting devices is configured to soak up the plurality of PV cells and recycle enormous amount of light. Hence, the recycling light fixture with the protective dome cover integrated with the plurality of PV cells is configured to utilize the unused light to a much greater extent. Therefore, the recycling light fixture with the protective dome further improves the recycle efficiency and adds valuable contribution in lowering the GHG emission and lowering the power costs, especially for economically challenged geographical regions.

According to one embodiment herein, the system for a home recycling light fixture model is provided. The system comprises the plurality of light emitting devices, the plurality of PV cells and the power summation circuit are integrated within the light fixture. The plurality of PV cells is configured to capture a light from the plurality of light emitting devices and adding the power generated to the power summation circuit. Further the power summation circuit adds the power from the utility power grid and the plurality of photovoltaic cells that generate power from the recycled light to supply power to the same plurality of light emitting devices of the home recycling light fixture model itself. In an example, the power consumption for the home recycling light fixture model is 18 Watts and the power harvested from the light recycling fixture is in the range of 18% to 29%.

According to one embodiment herein, the system for recycling light fixture model for an office or store, or commercial building is provided. The system comprises the plurality of light emitting devices, the plurality of PV cells and the power summation circuit. The plurality of PV cells is configured to capture light from the plurality of light emitting devices, generate electricity and add the generated electricity to the power summation circuit. Further, the power summation circuit adds the power from the utility power grid and the plurality of photovoltaic cells that generate power from recycled light, to supply power to the same plurality of light emitting devices in the office or store or commercial building recycling light fixture itself. In an example, the power consumption of the light recycling fixture model for the office or store or commercial building is 32 Watts and the power harvested from the recycling light fixture is in the range of 15% to 25%.

According to one embodiment herein, the system for a streetlight recycling light fixture model is provided. The system comprises the plurality of light emitting devices and, the plurality of PV cells integrated within the fixture, a combination of solar panel and the battery, and the power summation circuit. The plurality of PV cells is configured to capture a light from the plurality of light emitting devices integrated within the fixture, generate electricity, and add the generated electricity to the power summation circuit. Additionally, the solar panel is configured to capture the light from solar light and from ambient light sources, and add the power generated by the solar panel to the power summation circuit. Furthermore, the power summation circuit adds the power from the utility power grid and the plurality of the summation circuit supplies power to the same plurality of light emitting devices of the street light recycling light fixture itself. The battery is charged by the solar panel during the daytime. The battery and the power from the recycled light provides/complements a portion of the power to the street light recycling fixture in the evening. In an example, the power consumption for the street light recycling light fixture depends on the type of streetlight used, and it is 50 Watts and the power harvested from the recycled light fixture is in the range of 10% to 18%. The power harvested percentages is varied based on the geographical locations of the solar panel and the arrangement of the plurality of PV cells inside the light recycling fixture.

According to one embodiment herein, the solar panel for the street light recycling light fixture model are mounted at an angle, to prevent accumulation of dust, moisture, and snow, thereby making the street light recycling light fixture model suitable for installation at different geographical locations without any additional modifications. Furthermore, the plurality of light emitting devices within the street light recycling light fixture are arranged in such a way that the plurality of PV cells get maximum exposure to the light emitted by the plurality of light emitting devices. The plurality of PV cells is arranged in a triangular manner, which helps spread the light to the larger areas. The current observation is that streetlights only illuminate a small portion of the ground below.

According to one embodiment herein, the power summation circuit is configured to maximize the use of power from recycled light using the plurality of PV cells and to add only the required quantity of power from the utility power grid. This minimizes the cost of utility grid power and reduces green-house gas (GHG) emissions, the carbon tax and also the environmental impact. The power generated by the plurality of PV cells is used in the same recycling light fixture and is not transmitted anywhere else, thereby preventing the transmission losses.

According to one embodiment herein, the system further comprises a micro-processor/micro-controller based IoT (Internet of Things) configured for tracking the electrical parameters such as voltage, amperage etc., in the fixture, and to determine the total savings due to a recycling of light. The IoT device is further used to collect information, archive it, and perform data analytics for accurate GHG calculations, accurate monitoring of power consumption and the power generated from the recycled light within the fixture. The micro-processor/micro-controller is also used to calculate power consumed from the battery, if any, and the power grid. Furthermore, the micro-processor also monitors the efficiencies of LED and PV cells for further data analysis and to help improve a functionality of both the LEDs and the PV cells. In addition, the micro-processor/micro-controller is configured to gather data and perform data analysis for future improvements and efficiency enhancements. The data between different recycling light fixtures is shared using a power line communication method. The utilization of power line communication method eliminates a need for Wi-Fi, which eventually helps in reducing a communication related power consumption.

According to one embodiment herein, the IoT device, and the data analytics employed in the recycling light fixture of a residential building, commercial or in a streetlight are configured to monitor electrical parameters, GHG emissions and savings. The advantage of the feature is that the data between different recycling light fixtures within the residential buildings, commercial buildings, and/or between streetlights is shared. The data between different residential buildings is shared community wise. The data between different commercial buildings is shared within a section of a city or town. The data between different streetlights is shared across communities, towns, and cities. Furthermore, the advantages of sharing data and applying data analytics is numerous. The data sharing and applying data analytics by the IoT technology helps to identify spots of high-power consumption and suggest ways to reduce power consumption. Further, the IoT technology is configured to improve efficiencies and monitor assets in terms of the plurality of light emitting devices and power generated from recycled light using the plurality of PV cells. The IoT technology is configured to accurately monitor greenhouse gas emissions (GHC) thereby reducing the emissions and the carbon tax and hence helps the households, businesses, and cities to save on power bills and, carbon tax to free up precious funds for more productive usage, especially in economically challenged countries. The biggest advantage is to reduce the negative impact on the environment and global warming. In addition, the advantages of the combined system of recycled light generation, IoT and data analytics are many. The integrated LED, PV cells and the pertinent circuitry is fabricated in modular fashion i.e., each module is provided with a certain number of LEDs, PV cells and its circuitry; these modules are assembled like a Lego or jigsaw as per the size, shape, and the luminescence requirements.

According to one embodiment herein, a method for recycling light at home, store, commercial buildings, and streetlight fixtures, is provided. The method comprises the steps of designing a recycling light fixture comprising a plurality of light emitting devices, a lining of plurality of PV cells, a light base, and an outer frame. Moreover, the recycling light fixture is configured to be designed with or without a protective dome cover. The plurality of light emitting devices includes bulbs or LED lamps. The method further includes capturing the light emitted by the plurality of light emitting devices by the plurality of PV cells to generate electricity. Then the method includes, adding the generated electricity by the plurality of PV cells to a power summation circuit and adding the power from a utility power grid to supply the power to the plurality of the same light emitting fixture itself.

According to one embodiment herein, the recycling light fixture helps to utilize unused light emitted by the plurality of light emitting devices, which is harvested and recycled to reduce the power consumption from the power grid. Furthermore, the method eliminates the usage of battery, as all the power generated by the recycling light fixture using the plurality of PV cells, is utilized completely to power the plurality of light emitting devices itself. In addition, the method utilizes a capacitor to hold the charge, when there is a need, while the plurality of PV cells generates power during daytime.

According to one embodiment herein, the amount of recycle power generated by the recycling light fixture with the protective dome cover is approximately 29% and the amount of recycle power generated by the recycling light fixture without the protective dome cover is approximately 18.3%. However, in the recycling light fixture without the protective dome cover the amount of light and the photon energy reflected back to the ceiling is less and thus, amount of recycling power generated is less. Whereas in the recycling light fixture with the protective dome cover integrated with the plurality of PV cells and the plurality of light emitting devices is much higher and is configured to soak up the plurality of PV cells and recycle enormous amount of light. Hence, the recycling light fixture with the protective dome cover integrated with the plurality of PV cells is configured to utilize the unused light to a much larger extent. Therefore, the recycling light fixture with the protective dome further improves the recycle efficiency and adds valuable contribution in lowering the GHG emission, the carbon tax and also lowering the power costs, especially for economically challenged geographical regions.

According to one embodiment herein, the method finds application at home, store, commercial and street light fixtures. The method for a home recycling light fixture model comprises the steps of capturing the light emitted by the plurality of light emitting devices, through the plurality of PV cells within the same fixture, generating the power and sending this power to the power summation circuit and adding the power from the utility power grid. The summed-up power is then supplied to the same plurality of light emitting devices of the home recycling light fixture itself. The power consumption for the home recycling light fixture model is approximately 18 Watts and the power harvested from the recycling light fixture is in the range of 18% to 29%.

According to one embodiment herein, the method for an office or store or commercial building recycling light fixture model comprising the steps of capturing light emitted by the plurality of light emitting devices, through the plurality of PV cells within the same fixture, generating the power, sending this power to the power summation circuit, and adding the power from the utility power grid. The summed-up power is then supplied to the same plurality of light emitting devices of the office or store or commercial building recycling light fixture itself. The power consumption for the office or store or commercial building recycling light fixture is approximately 32 Watts and the power harvested from the recycling light fixture is in the range of 15% to 25%.

According to one embodiment herein, the method for a streetlight recycling light fixture model comprising the steps of capturing the light emitted by the plurality of light emitting devices, through the plurality of PV cells within the same fixture, from the plurality of PV cells in the solar panel mounted on the streetlight. The method further includes adding the power generated by the plurality of PV cells integrated within the fixture plus the power generated by solar panel in the power summation circuit and then also adding the power from the utility power grid. The summed-up power is then supplied to the same plurality of light emitting devices of the street recycling light fixture itself. The typical streetlight is 50 Watts and the power harvested from the recycled light fixture and the solar panel is in the range of 10% to 18%. However, the power consumption for the street light recycling light fixture depends on the type of streetlight used. Furthermore, the power harvested percentages vary based on the geographical locations of the solar panel and the arrangement of the plurality of PV cells inside the recycle light fixture.

According to one embodiment herein, the power summation circuit is configured to maximize the use of power generated by the recycled light from the plurality of PV cells within the fixture and only add required short fall quantity of power from the utility power grid. This ensures minimizing the cost of grid power, to minimizing the green-house gas (GHG) emissions, minimizing the carbon tax, and also minimizing the environmental impact. Moreover, the power generated by the plurality of PV cells is used in the same recycling light fixture and is not transmitted anywhere else, thereby eliminating transmission losses.

According to one embodiment herein, the method further comprises a micro-processor/micro-controller based IoT (Internet of Things) configured for tracking the electrical parameters such as voltage, amperage etc., and to determine the total savings due to recycling of light. The IoT device is further used to collect information, archive, and perform data analytics for accurate GHG calculations, accurate monitoring of power consumption and the power generated from the recycled light fixture. The micro-processor/micro-controller is also used to calculate power consumed from battery, if any, and the utility power grid. Furthermore, the micro-processor also monitors the light source (bulbs or LEDs) and PV cells efficiencies for further data analysis and to help improve both the light sources and the PV cells functionality. In addition, the micro-processor/micro-controller is configured to gather data and perform data analysis for future improvements. The data between different recycling light fixtures is shared using power line communication method. The utilization of power line communication method eliminates the need for Wi-Fi, which eventually helps in reducing communication related power consumption.

According to one embodiment herein, the IoT and data analytics employed in the recycling light fixture of a residential building, commercial or in a streetlight is configured to monitor electrical parameters, GHG emissions and savings. The advantage of the feature is that the data between different recycling light fixtures within the residential buildings, commercial buildings, and/or between streetlights is shared. The data between different residential buildings are shared community wise and data between different commercial buildings are shared within a section of a city or town and the data between different streetlights are shared across communities, towns, and cities. Furthermore, the advantages of sharing data and applying data analytics is numerous. The data sharing and applying data analytics by the IoT technology helps to identify spots of high-power consumption and suggest ways to reduce power consumption. Further, the IoT device is configured to improve efficiencies and monitor asset in terms of the plurality of light emitting devices and power generated from recycled light using the plurality of PV cells. Furthermore, the IoT is configured to accurately monitor greenhouse gas emissions (GHC) thereby reducing emissions and the carbon tax and hence helps the households, businesses, and cities to save on power bills and, carbon tax to free up precious funds for more productive usage, especially in economically challenged countries. The biggest advantage is on reducing the negative impact on the environment and global warming. In addition, the advantages of the combined system of recycled light generation, IoT and data analytics are many. The integrated LED, PV cells and the pertinent circuitry is fabricated in modular fashion i.e., each module is provided with a certain number of LEDs, PV cells and its circuitry; these modules are assembled like a Lego or jigsaw as per the size, shape, and the luminescence requirements.

The foregoing summary is illustrative only and is not intended to be in any way limiting. In addition to the illustrative aspects, embodiments, and features described above, further aspects, embodiments, and features will become apparent by reference to the drawings and the following detailed description.

These and other aspects of the embodiments herein will be better appreciated and understood when considered in conjunction with the following detailed description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1A:
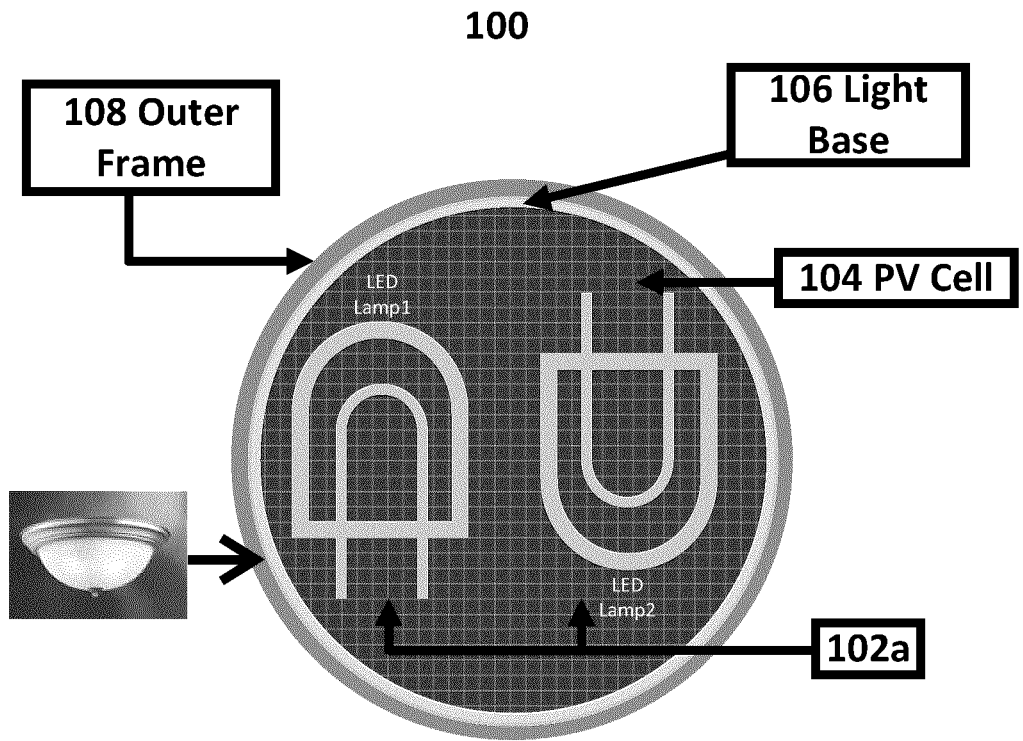
FIG. 1A and FIG. 1B illustrates the circuit diagram of a system assembly for recycling light home/store/commercial buildings and streetlight fixtures according to an embodiment herein.

Although the specific features of the embodiments herein are shown in some drawings. This is done for convenience only as each feature may be combined with any or all of the other features in accordance with the embodiments herein.

DETAILED DESCRIPTION OF THE EMBODIMENTS HEREIN

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The foregoing of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

The various embodiments herein provide a system and method for recycling light at home, store, commercial buildings, and street-light fixtures. In an embodiment, the principle of recycling (or harvesting) light is mainly by designing a special recycling light fixture, (or retrofitting existing fixtures using Lego style modular design), wherein the light fixture has a lining of Photovoltaic cells which captures the light being emitted by the light source in the fixture itself. Typically, the light fixture includes a light emitting device such as bulb or LEDSs that emits light in all directions. However, the light that is emitted towards the fixture (the ceiling) as well as the light reflected back from the fixture cover, or the dome is wasted for the most part. So, the light fixture further includes a structure that captures this light, generates electricity using photovoltaic cell and feeds it back into the same light bulbs. The unused light is there by recycled and this reduces the power consumption from the power grid. Hence, the recycle light structure may be used in homes store, commercial buildings, or street-light fixtures.

According to one embodiment herein, a system for recycling light at home, store, commercial buildings, and streetlight fixtures is provided. The system comprises a recycling light fixture comprising a plurality of light emitting devices configured to emit light in all directions, a lining of plurality of photovoltaic cells (PV cells) configured to capture the light being emitted by the plurality of light emitting devices to generate electricity, and to power the plurality of light emitting devices itself. The lining of the plurality of photovoltaic cells are provided for the plurality of light emitting devices such as bulbs or LED lamps. Furthermore, the recycling light fixture comprises a light base covered by an outer frame, and the light base includes the plurality of photovoltaic cells (PV cells). Moreover, the outer frame is configured to be designed with or without a protective dome cover. The system further comprises a power summation circuit coupled to a power grid configured to receive the power generated by the plurality of photovoltaic cells embedded on the recycling light fixture. The power summation circuit adds the power from the power grid and the recycled power from the plurality of photovoltaic cells to supply the power to the plurality of light emitting devices itself. The plurality of light emitting devices may include bulb or LED lamps.

According to one embodiment herein, the recycling light fixture is configured to be retrofitted to the existing light fixtures in Lego style or Jigsaw style modular design as per the size, shape, and luminescence requirements. The shape and size of the plurality of PV cells, the light base and the outer frame are selected based on the style and wattage of the plurality of light emitting devices. Furthermore, the recycling light fixture helps to utilize unused light emitted by the plurality of light emitting devices, which is recycled to produce electricity and to reduce the power consumption from the utility power grid.

According to one embodiment herein, the system eliminates the usage of battery, as all the power generated by the recycling light fixture using the plurality of PV cells is utilized completely to power the plurality of light emitting device itself. Furthermore, the system utilizes a capacitor to hold the charge instead of a battery when there is a need such as to store power while the plurality of PV cells generates power during daytime.

According to one embodiment herein, the amount of recycle power generated by the recycling light fixture with the protective dome cover is 29% and the amount of recycle power generated by the recycling light fixture without the protective dome cover is 18.3%. In the recycling light fixture without the protective dome cover the amount of light and the photon energy reflected back to the ceiling is much lower and thus, amount of recycling power generated is less, whereas the in recycling light fixture with the protective dome cover the amount of light and photons reflected back to the celling where the integrated plurality of PV cells and the plurality of light emitting devices is configured to soak up the plurality of PV cells and recycle enormous amount of light. Hence, the recycling light fixture with the protective dome cover integrated with the plurality of PV cells is configured to utilize the unused light to a much greater extent. Therefore, the recycling light fixture with the protective dome further improves the recycle efficiency and adds valuable contribution in lowering the GHG emission and lowering the power costs, especially for economically challenged geographical regions.

According to one embodiment herein, the system for a home recycling light fixture model is provided. The system comprises the plurality of light emitting devices, the plurality of PV cells and the power summation circuit, all integrated within the recycling light fixture. The plurality of PV cells is configured to capture light from the plurality of light emitting devices and adding the power generated to the power summation circuit. Further the power summation circuit adds the power from the utility power grid and the plurality of photovoltaic cells that generate power from recycled light, to supply power to the same plurality of light emitting devices of the home recycling light fixture model itself. In an example, the power consumption for the home light recycling fixture model is 18 Watts and the power harvested from the recycling light fixture is in the range of 18% to 29%.

According to one embodiment herein, the system for an office or store or commercial building recycling light fixture model is provided. The system comprises the plurality of light emitting devices, the plurality of PV cells and the power summation circuit. The plurality of PV cells is configured to capture light from the plurality of light emitting devices, generate electricity and adding the generated electricity to the power summation circuit. Further, the power summation circuit adds the power from the utility power grid and the plurality of Photovoltaic cells that generate power from recycled light, to supply power to the same plurality of light emitting devices of the office or store or commercial building recycling light fixture itself. In an example, the power consumption for the office or store or commercial building recycling light fixture model is 32 Watts and the power harvested from the light recycling fixture is in the range of 15% to 25%.

According to one embodiment herein, the system for a streetlight recycling light fixture model is provided. The system comprises the plurality of light emitting devices and, the plurality of PV cells integrated within the recycling fixture, a combination of solar panel and the battery, and the power summation circuit. The plurality of PV cells is configured to capture light from the plurality of light emitting devices integrated within the fixture, generate electricity, and add the generated electricity to the power summation circuit. Additionally, the solar panel is configured to capture the light from solar light and from ambient light sources, and add the power generated by the solar panel to the power summation circuit. Furthermore, the power summation circuit adds the power from the utility power grid, the solar panel, and the plurality of PV cells to supply power to the same plurality of light emitting devices of the street light recycling light fixture itself. The battery is charged by the solar panel during the daytime. In the evening the battery, and the power from recycled light provide portion of the power to the street light recycling fixture. In an example, the power consumption for the street light recycling light fixture depends on the type of streetlight used, and it is 50 Watts and the power harvested from the recycled light fixture, along with the solar panel is in the range of 10% to 18%. The power harvested percentages vary based on the geographical locations of the solar panel and the arrangement of the plurality of PV cells inside the light recycling fixture.

According to one embodiment herein, the solar panel for the street light recycling light fixture model are mounted at an angle, to prevent accumulation of dust, moisture, and snow, thereby making the street light recycling light fixture model suitable for installation at different geographical locations without any additional modifications. Furthermore, the plurality of light emitting devices within the street light recycling light fixture are arranged in such a way that the plurality of PV cells get maximum exposure to the light emitted by the plurality of light emitting devices. The plurality of PV cells is arranged in a triangular manner, which helps spread the light to the larger areas. The current observation is that streetlights only illuminate a small portion of the ground below.

According to one embodiment herein, the power summation circuit is configured to maximize the use of power from recycled light using the plurality of PV cells and add only the remaining required quantity of power from the utility power grid. This minimizes the cost of utility grid power, reduces green-house gas (GHG) emissions, reduces carbon tax, and also reduces the environmental impact. The power generated by the plurality of PV cells is used in the same recycling light fixture and is not transmitted anywhere else, thereby eliminating transmission losses. Furthermore, the use of recycling power helps to eliminate the need for the batteries, which is expensive, non-degradable and are difficult to dispose or recycle.

According to one embodiment herein, the system further comprises a micro-processor/micro-controller based IoT (Internet of Things) configured for tracking the electrical parameters such as voltage, amperage etc. in the fixture, and to determine the total savings due to recycling of light. The IoT device is further used to collect information, archiving it, and performing data analytics for accurate GHG calculations, accurate monitoring of power consumption and the power generated from the recycled light within the fixture. The micro-processor/micro-controller is also used to calculate power consumed from battery, if any, and the power grid. Furthermore, the micro-processor also monitors the LED and PV cells efficiencies for further data analysis and to help improve both the LEDs and the PV cells functionality. In addition, the micro-processor/micro-controller is configured to gather data and perform data analysis for future improvements and efficiency enhancements. The data between different recycling light fixtures is shared using power line communication method. The utilization of power line communication method eliminates the need for Wi-Fi, which eventually helps in reducing communication related power consumption.

According to one embodiment herein, the IoT and data analytics employed in the recycling light fixture of a residential building, commercial or in a streetlight is configured to monitor electrical parameters, GHG emissions and savings. The advantage of the feature is that the data between different recycling light fixtures within the residential buildings, commercial buildings, and/or between streetlights is shared. The data between different residential buildings are shared community wise and data between different commercial buildings are shared within a section of a city or town and the data between different streetlights are shared across communities, towns, and cities. Furthermore, the advantages of sharing data and applying data analytics is numerous. The data sharing and applying data analytics by the IoT technology helps to identify spots of high-power consumption and suggest ways to reduce power consumption. Further, the IoT is configured to improve efficiencies and monitor asset in terms of the plurality of light emitting devices and power generated from the recycled light of the plurality of PV cells. The IoT is configured to accurately monitor greenhouse gas emissions (GHC) thereby reducing emissions and the carbon tax and hence helps the households, businesses, and cities to save on power bills and, carbon tax to free up precious funds for more productive usage, especially in economically challenged countries. The biggest advantage is to reduce the negative impact on the environment and global warming. In addition, the advantages of the combined system of recycled light generation, IoT and data analytics are many. The integrated LED, PV cells and the pertinent circuitry is fabricated in modular fashion i.e., each module is provided with a certain number of LEDs, PV cells and its circuitry: these modules are assembled like a Lego or jigsaw as per the size, shape, and the luminescence requirements.

According to one embodiment herein, a method for recycling light at home, store, commercial buildings, and streetlight fixtures is provided. The method comprises the steps of designing a recycling light fixture comprising a plurality of light emitting devices, a lining of plurality of PV cells, a light base, and an outer frame. Moreover, the recycling light fixture is configured to be designed with or without a protective dome cover. The plurality of light emitting devices includes bulbs or LED lamps. The method further includes capturing the light emitted by the plurality of light emitting devices by the plurality of PV cells to generate electricity. Then the method includes, adding the generated electricity by the plurality of PV cells to a power summation circuit and adding the power from a utility power grid to supply the power to the plurality of the same light emitting fixture itself.

According to one embodiment herein, the recycling light fixture helps to utilize unused light emitted by the plurality of light emitting devices, which is harvested and recycled to reduce the power consumption from the power grid. Furthermore, the method eliminates the usage of battery, as all the power generated by the recycling light fixture using the plurality of PV cells, is utilized completely to power the plurality of light emitting devices itself. In addition, the method utilizes a capacitor to hold the charge, when there is a need, while the plurality of PV cells generates power during daytime.

According to one embodiment herein, the amount of recycle power generated by the recycling light fixture with the protective dome cover is approximately 29% and the amount of recycle power generated by the recycling light fixture without the protective dome cover is approximately 18.3%. However, in the recycling light fixture without the protective dome cover the amount of light and the photon energy reflected back to the ceiling is less and thus, amount of recycling power generated is less, whereas the recycling light fixture with the protective dome cover integrated with the plurality of PV cells and the plurality of light emitting devices is much higher and is configured to soak up the plurality of PV cells and recycle enormous amount of light. Hence, the recycling light fixture with the protective dome cover integrated with the plurality of PV cells is configured to utilize the unused light to a much larger extent. Therefore, the recycling light fixture with the protective dome further improves the recycle efficiency and adds valuable contribution in lowering the GHG emission, carbon tax and also lowering the power costs, especially for economically challenged geographical regions.

According to one embodiment herein, the method finds application at home, store, commercial and street light fixtures. The method for a home recycling light fixture model comprises the steps of capturing the light emitted by the plurality of light emitting devices, through the plurality of PV cells within the same fixture, generating the power by the plurality of PV cells, sending the power generated to the power summation circuit and adding the power from the utility power grid. The summed-up power is then supplied to the same plurality of light emitting devices of the home recycling light fixture itself. The power consumption for the home recycling light fixture model is approximately 18 Watts and the power harvested from the recycling light fixture is in the range of 18% to 29%.

According to one embodiment herein, the method for an office or store or commercial building recycling light fixture model comprising the steps of capturing light emitted by the plurality of light emitting devices, through the plurality of PV cells, within the same fixture, generating the power, sending this power to the power summation circuit, and adding the power from the utility power grid. The summed-up power is then supplied to the same plurality of light emitting devices of the office or store or commercial building recycling light fixture itself. The power consumption for the office or store or commercial building recycling light fixture is approximately 32 Watts and the power harvested from the recycling light fixture is in the range of 15% to 25%.

According to one embodiment herein, the method for a streetlight recycling light fixture model comprising the steps of capturing the light emitted by the plurality of light emitting devices, through the plurality of PV cells within the same fixture, from the plurality of PV cells in the solar panel mounted on the streetlight. The method further includes adding the power generated by the plurality of PV cells integrated within the fixture plus the power generated by solar panel in the power summation circuit and then also adding the power from the utility power grid. The summed-up power is then supplied to the same plurality of light emitting devices of the street recycling light fixture itself. The typical streetlight is 50 Watts and the power harvested from the recycled light fixture and the solar panel is the range of 10% to 18%. However, the power consumption for the street light recycling light fixture depends on the type of streetlight used. Furthermore, the power harvested percentages vary based on the geographical locations of the solar panel and the arrangement of the plurality of PV cells inside the recycle light fixture.

According to one embodiment herein, the power summation circuit is configured to maximize the use of power generated by the recycled light from the plurality of PV cells within the fixture and only add required short fall quantity of power from the utility power grid. This ensures minimizing the cost of grid power, to minimizing the green-house gas (GHG) emissions, minimizing the carbon tax, and also minimizing the environmental impact. Moreover, the power generated by the plurality of PV cells is used in the same recycling light fixture and is not transmitted anywhere else, thereby eliminating transmission losses.

According to one embodiment herein, the method further comprises a micro-processor/micro-controller based IoT (Internet of Things) configured for tracking the electrical parameters such as voltage, amperage etc., and to determine the total savings due to recycling of light. The IoT device is further used to collect information, archive, and perform data analytics for accurate GHG calculations, accurate monitoring of power consumption and the power generated from the recycled light fixture. The micro-processor/micro-controller is also used to calculate power consumed from battery, if any, and the utility power grid. Furthermore, the micro-processor also monitors the light source (bulbs or LEDs) and PV cells efficiencies for further data analysis and to help improve both the light source and the PV cells functionality. In addition, the micro-processor/micro-controller is configured to gather data and perform data analysis for future improvements. The data between different recycling light fixtures is shared using power line communication method. The utilization of power line communication method eliminates the need for Wi-Fi, which eventually helps in reducing communication related power consumption.

According to one embodiment herein, the IoT technology and data analytics employed in the recycling light fixture of a residential building, commercial or in a streetlight is configured to monitor electrical parameters, GHG emissions and savings. The advantage of the feature is that the data between different recycling light fixtures within the residential buildings, commercial buildings, and/or between streetlights is shared. The data between different residential buildings are shared community wise and data between different commercial buildings are shared within a section of a city or town and the data between different streetlights are shared across communities, towns, and cities. Furthermore, the advantages of sharing data and applying data analytics is numerous. The data sharing and applying data analytics by the IoT technology helps to identify spots of high-power consumption and suggest ways to reduce power consumption. Further, the IoT technology is configured to improve efficiencies and monitor asset in terms of the plurality of light emitting devices and power generated from recycled light using the plurality of PV cells. Furthermore, the IoT is configured to accurately monitor greenhouse gas emissions (GHC) thereby reducing emissions and the carbon tax and hence help the households, businesses, and cities to save on power bills and, carbon tax to free up precious funds for more productive usage, especially in economically challenged countries. The biggest advantage is in reducing the negative impact on the environment and global warming. In addition, the advantages of the combined system of recycled light generation, IoT and data analytics are many. The integrated LED, PV cells and the pertinent circuitry is fabricated in modular fashion i.e., each module is provided with a certain number of LEDs, PV cells and its circuitry: these modules are assembled like a Lego or jigsaw as per the size, shape, and the luminescence requirements.

Figure 1B:
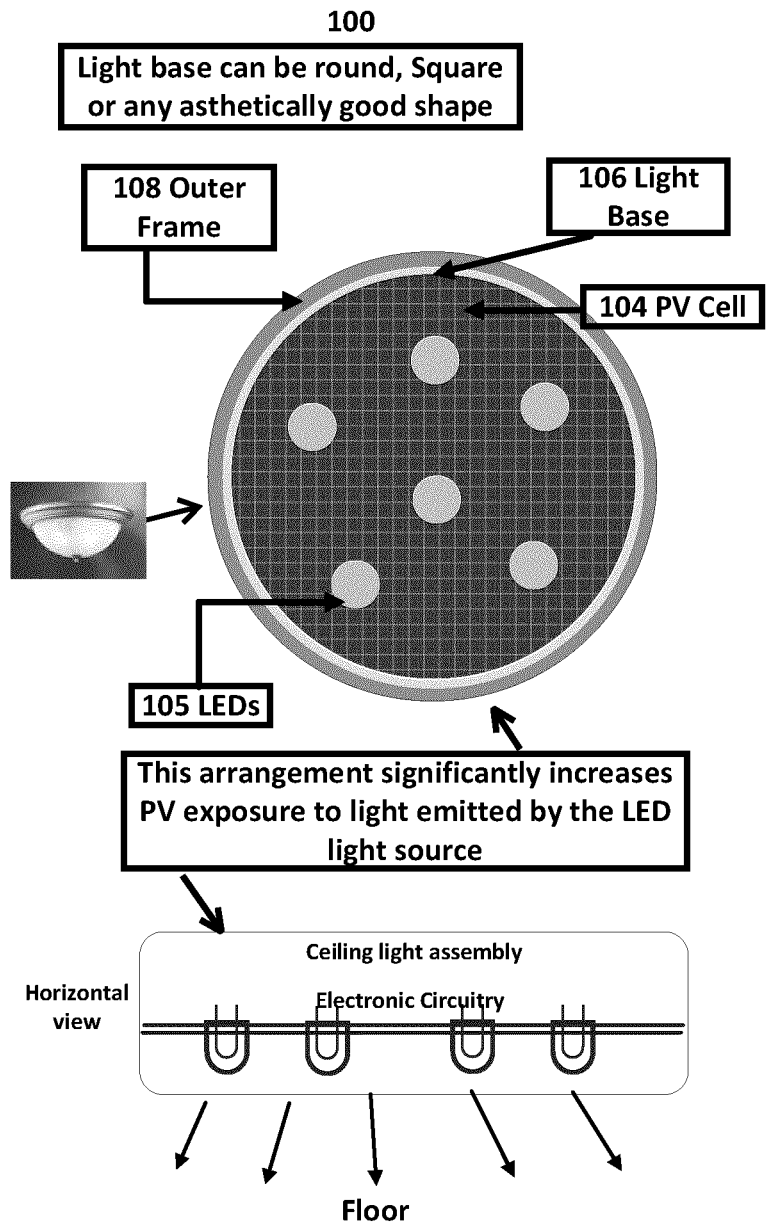
Figure 1C:
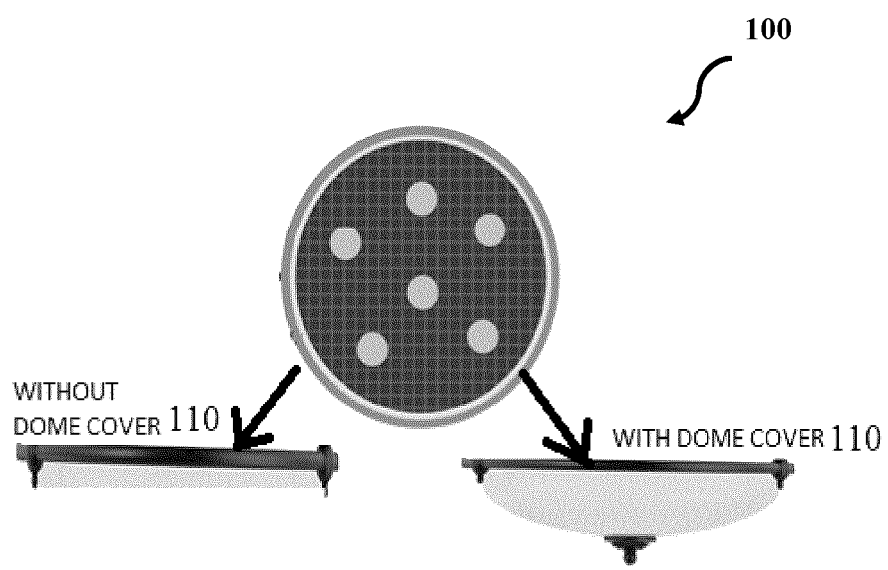
FIG. 1C illustrates the block diagram of a system assembly for recycling light home/store/commercial buildings and streetlight fixtures with and without a protective dome cover, according to an embodiment herein.

FIG. 1A and FIG. 1B illustrates a circuit diagram of a system 100 of recycling light, according to one embodiment herein. In an embodiment, the system 100 includes the recycling light fixture, wherein the recycling light fixture includes a plurality or light emitting devices such as one or more bulbs or LEDs 102a, a plurality of PV Cells 104, a light base 106 and an outer frame 108. The plurality of light emitting devices 102a is provided with the plurality of PV Cells 104. The light base 106 is covered by the outer frame 108, wherein the light base (106) includes the plurality of PV Cells 104. Moreover, the outer frame 108, is configured to be designed with or without a protective dome cover 110 as illustrated in FIG. 1C. The shape and size of the plurality of PV Cells 104, light base 106, Outer frame 108 are selected based on style and, wattage of plurality of light emitting devices.

According to one embodiment herein, the recycling fixture includes the plurality of light emitting devices 102a that emits light in all directions. However, the light that is emitted towards the fixture (the ceiling) is wasted for the most part. Hence, the recycling light fixture further includes a structure that captures this light, generates electricity using the plurality of photovoltaic cells 104 and feeds it back into the same plurality of light emitting devices itself 102a. Therefore, the unused light is there by recycled and this reduces the power consumption from the power grid. The current structure may be used in home or store fixtures. As shown in the FIG. 1A, there are areas of the bulbs 102a that could block the light from reaching the plurality of photovoltaic cells 104. Hence, by changing the design of the recycling fixture, the plurality of photovoltaic cells 104 and possibly the shape of the light bulbs 102a, the system 100 can improve the levels of recycled light. The principle of harvesting light is mainly on designing a special fixture which has a lining of plurality of photovoltaic cells 104 which captures the light being emitted by the light source in the recycling fixture itself.

According to one embodiment herein, the FIG. 1B depicts, incorporating the LEDs in the recycling fixture, itself, the amount of the plurality of PV cells 104, that gets more light increases substantially. The existing fixture layout, which is shown in FIG. 1A, blocks significant PV cells because of the shape of the bulbs, and the non-emitting part of the bulb cover significant portion of the PV cells there by reducing the amount of light striking the plurality of PV cells 104 which in turn reduce the PV output. With respect to the arrangement shown in FIG. 1B, most of the wasted light is captured by the plurality of PV cells 104. The system 100 eliminates the use of battery because all the power generated by the recycling light using PV cells is used completely to power the plurality of light emitting devices 102a for the bulbs and 105 for the LEDs itself. Furthermore, the use of storage battery has its own disadvantages because they have limited life and need to be replaced. Further there is also a current leakage from the battery. Batteries are also difficult to dispose in environmentally safe way. Therefore, the system 100 uses a capacitor to hold charge when there is a need such as the possibility of the plurality PV cells 104 generating power during daytime. The life of capacitors is longer. They are more reliable, cost effective and easy to procure.

Figure 2:
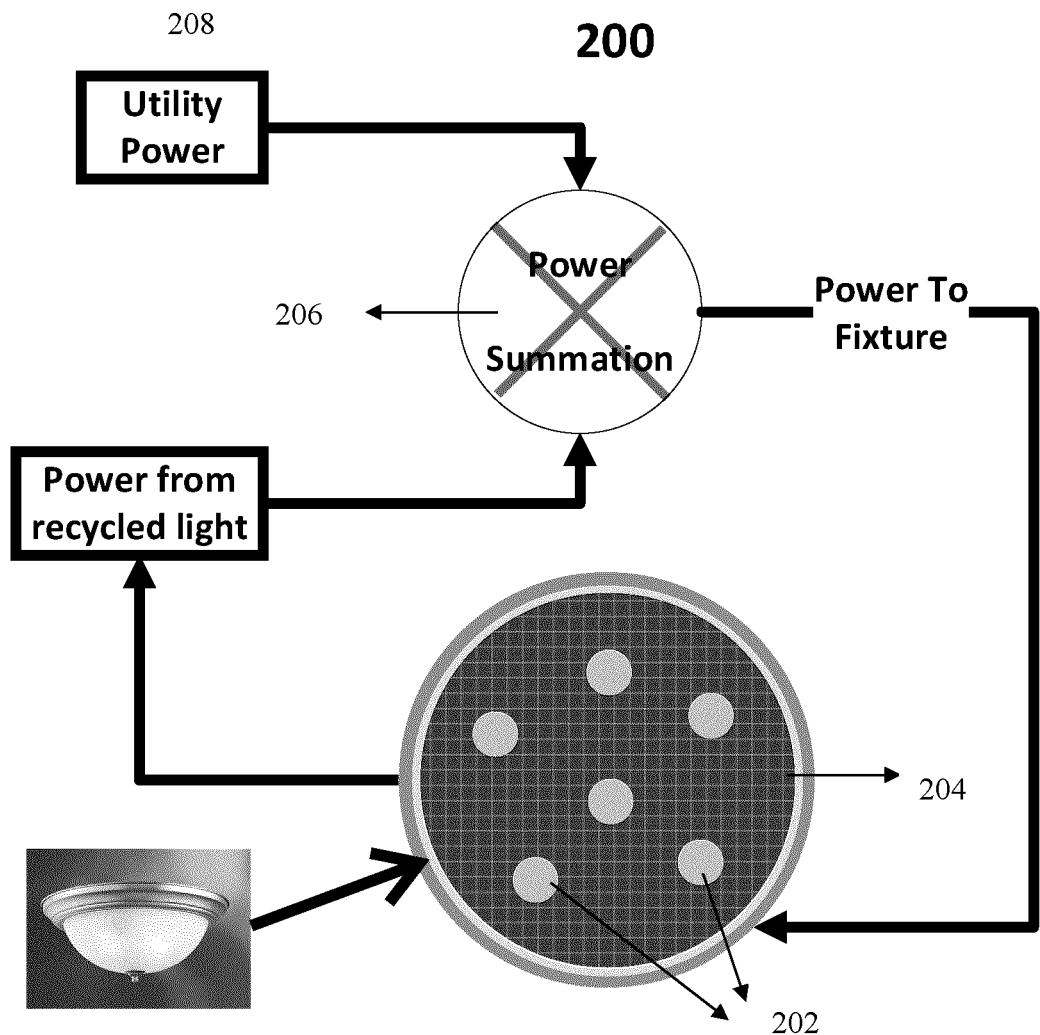
FIG. 2 illustrates a block summation circuit diagram of a home light fixture model, according to an embodiment herein.

According to one embodiment herein, the FIG. 1C illustrates the block diagram of a system assembly for recycling light home/store/commercial buildings and streetlight fixtures with and without a protective dome cover. The protective dome cover 110 is coupled to the outer frame 108 and configured to cover the entire recycling light fixture. The recycling light fixture with the protective dome cover 110 generates recycle power up to 29% and the recycling light fixture without the protective dome cover 110 generates recycle power up to 18.3%. In the recycling light fixture without the protective dome cover the amount of light and the photon energy reflected back to the ceiling is much lower and thus, amount of recycling power generated is less, whereas the recycling light fixture with the protective dome cover the amount of light and photons reflected back to the celling where the integrated plurality of PV cells and the plurality of light emitting devices is configured to soak up the plurality of PV cells and recycle enormous amount of light. Hence, the recycling light fixture with the protective dome cover integrated with the plurality of PV cells is configured to utilize the unused light to a much greater extent. Therefore, the recycling light fixture with the protective dome further improves the recycle efficiency and adds valuable contribution in lowering the GHG emission and lowering the power costs, especially for economically challenged geographical regions According to one embodiment herein, the FIG. 2 illustrates the block summation circuit diagram of a home light fixture model 200, according to one embodiment herein. The summation circuit is integrated and feeds the recycled power into the same fixture itself thereby eliminating the need for batteries and or transmission losses. In an embodiment, the home light fixture 200 includes the plurality of photo voltaic cells 204 and a power summation circuit 206. The plurality of photovoltaic cells 204 collects the light from the plurality of light emitting devices such as bulb or LEDs 202 and connects the power generated by the plurality of photovoltaic cells 204 to the power summation circuit 206. The power summation circuit 206 further, adds the power from the utility power grid 208 and the plurality of photovoltaic cells 204 to supply power to the same home light fixture itself. The power summation circuit 206 is so designed that it maximizes use of recycle light power from the plurality of PV cells 204 and then adds the power from utility grid 208 whenever needed. This minimizes use of costly utility grid power and, which also reduces GHG emission and thereby reducing the environmental impact. In an example, the power consumption for the home light recycling fixture model 200 is 18 Watts and the power harvested is approximately 18% to 29%. Furthermore, for the home fixtures 200, the light bulbs or the plurality of light emitting devices emit light in all directions. However, the light that is emitted towards the fixture (the ceiling) is wasted for the most part. Hence, the newly designed fixture disclosed in the embodiments herein captures this light, generates electricity using the plurality of photovoltaic cells 204 and feeds it back into the same light fixture. The unused light is there by recycled and this reduces the power consumption from the power grid 208.

Figure 3:
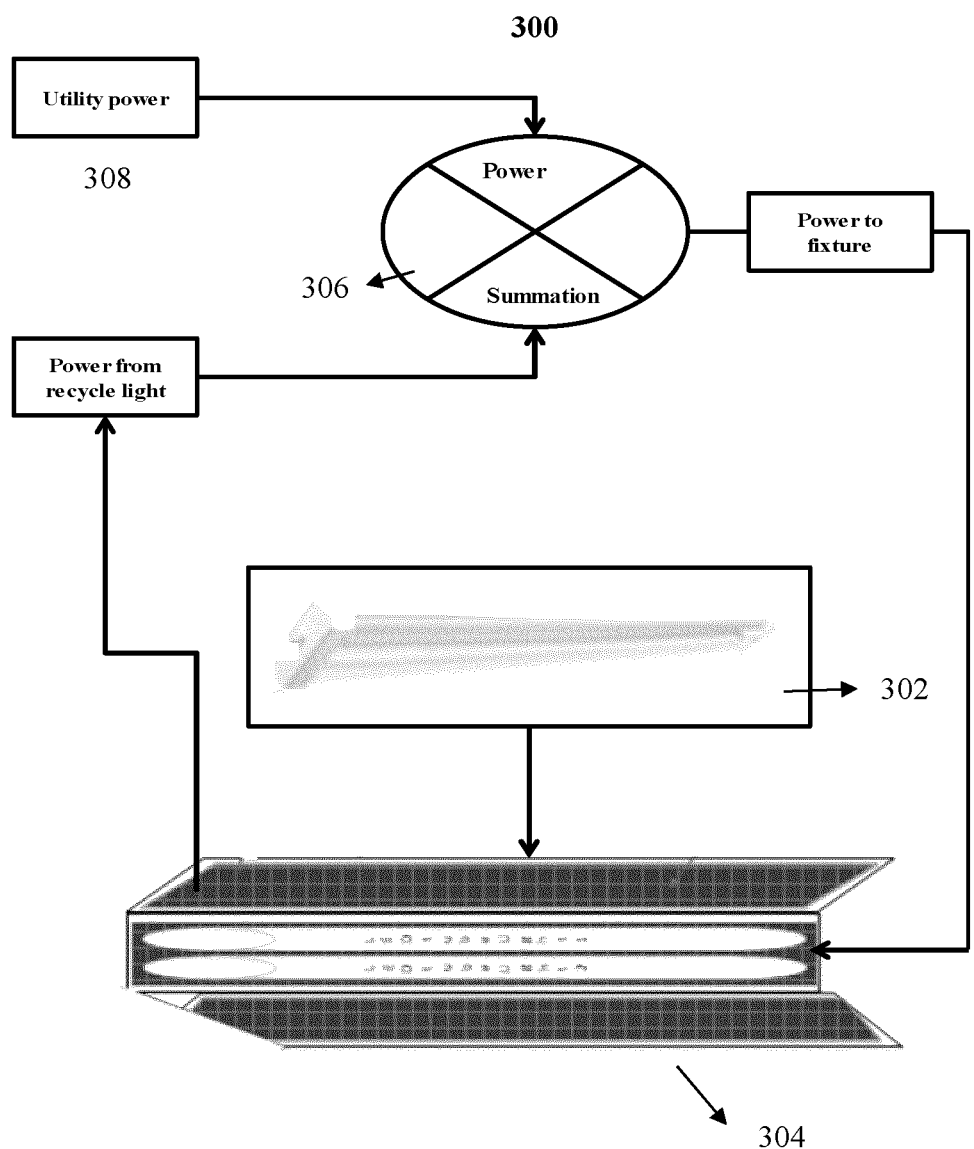
FIG. 3 illustrates a block summation circuit diagram of an office/store/commercial light fixture model, according to an embodiment herein.

According to one embodiment herein, the FIG. 3 illustrates a block summation circuit diagram of an office/store/commercial building recycling light fixture model 300, according to one embodiment herein. In an embodiment, the office/store/commercial building light fixture 300 includes the plurality of photovoltaic cells 304 and the power summation circuit 306. The summation circuit is integrated and feeds the recycled power into the same fixture itself thereby eliminating the need for batteries and or transmission losses. The plurality of photovoltaic cells 304 collects the light from the plurality of light emitting devices 302, generates electricity and then adds this power to the power summation circuit 306. The power summation circuit 306, further adds the power from the utility power grid 308 and the plurality of photovoltaic cells 304 and supplies it to the light bulbs/LEDs 302 in the same recycling light fixture itself. This eliminates the need to store or transmit the power there by enhancing the efficiency of the system. The power summation circuit 306 is so designed that it maximizes use of recycle light power from the plurality of PV cells 304 and then adds the power from utility grid 308 whenever needed. This minimizes use of costly utility grid power and, which also reduces GHG emission and thereby reducing the environmental impact. In an example, for the store/commercial light fixture model 300, the power consumption is 32 watts and the power harvested is approximately 15% to 25%. Furthermore, for the store and commercial building fixtures 300, the light bulbs or the plurality of light emitting devices 302 emit light in all directions. However, the light that is emitted towards the fixture (the ceiling) is wasted for the most part. Hence, the newly designed fixture disclosed in the embodiments herein captures this light, generates electricity using the plurality of photovoltaic cells 304 and feeds it back into the same light fixture. The unused light is there by recycled and this reduces the power consumption from the power grid 308.

Figure 4:
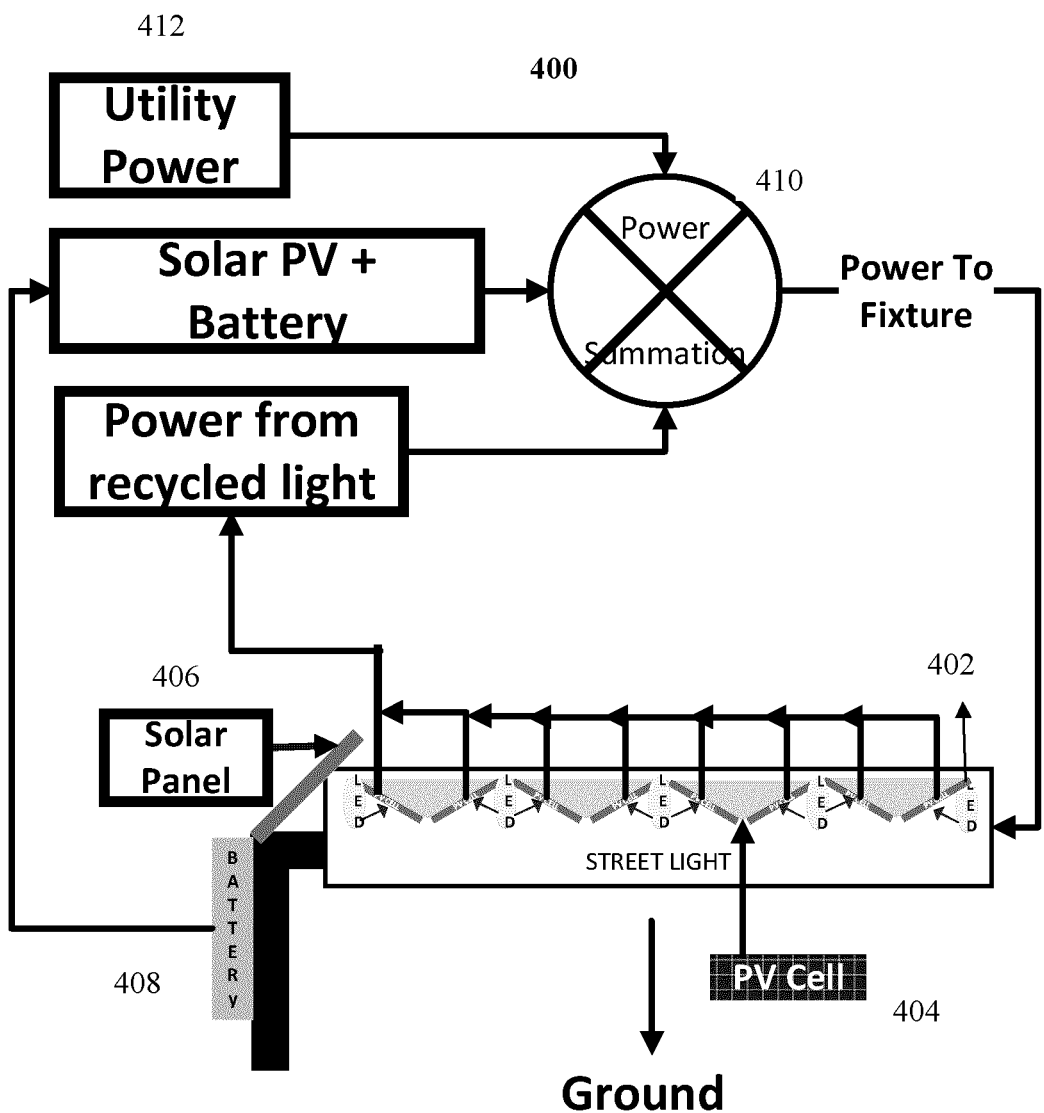
FIG. 4 illustrates a block summation circuit diagram of a streetlight fixture model, according to an embodiment herein.

According to one embodiment herein, the FIG. 4 shows a block summation circuit diagram of a streetlight fixture model 400, according to one embodiment herein. In an embodiment, the street-light fixture 400 includes a plurality of photovoltaic cells 404, a solar panel 406, a battery 408, and a power summation circuit 410. The plurality of photovoltaic cells 404 collects the light from the plurality of light emitting devices 402 and adds the power generated by the plurality of photovoltaic cells 404 to the power summation circuit 410. The summation circuit is integrated and feeds the recycled power into the same fixture itself thereby eliminating the need for additional batteries and or transmission losses. The solar panel 406 collects the light from the solar light and other ambient light sources and adds the power generated by the solar panel 406 to the power summation circuit 410. The power summation circuit 410 adds the power from the utility power grid 412, the solar panel 406, and the plurality of photovoltaic cells 404 to supply power to the light bulbs/LEDs 402 in the street-light fixture itself. This eliminates the need to transmit the power there by enhancing the efficiency of the system. The power summation circuit 410 is so designed that it maximizes use of recycle light power from the plurality of PV cells 404 and the plurality of the solar panel and then adds the power from utility grid 412 whenever needed. This minimizes use of costly utility grid power which also reduces the GHG emissions, thereby reducing the environmental impact. Furthermore, for the street fixtures the principle is the same except for the fact that there is an additional solar panel 406 and a battery 408. The solar panel 406 charges the battery 408 shown in the FIG. 4 during the daytime. In the evening, the battery 408, and the power from recycled light provide portion of the power to the streetlight fixture. In an example, for the streetlight fixture, the power consumption depends upon type of light fixture but is approximately 50 Watts and the power generated from recycled light and the solar panel can be approximately 10% to 18%. These percentages vary based on geographical location (which will impact power generated by the solar panel) and the arrangement of PV cells inside the light fixture.

Moreover, the power summation circuit 410 shown in the FIG. 4 maximizes the use of power generated from the plurality of photovoltaic cells 404 so that storage is not required. Only in the case of the streetlights, the battery 408 is included to receive and store the power generated by the solar panel 406 during the daytime. In an embodiment, the solar cells mounted above the streetlights that capture the solar radiation during the day and charge the battery is designed to pivot in a way that captures maximum solar radiation. Also, these solar panel 406 are mounted at an angle so as to prevent accumulation of dust, moisture and snow thereby making it suitable for installation at different geographical locations without any additional modifications. Further, the LEDs within the structure are arranged in such a way that the plurality of PV cells 404 get maximum exposure to the light emitted by the LEDs 402. Also, the triangular arrangement of the plurality of PV cells 404 helps spread the light to larger areas. The current observation is that streetlights only illuminate a small portion of the ground below.

Furthermore, in an embodiment the power generated by the plurality of PV cells is used in the same light fixture. It is not transmitted anywhere else there by eliminating transmission losses. In case of need to store the power generated by the solar panel during the day, the battery is also installed in the assembly. The circuit is designed to drain the battery and use maximum power from the recycled light to minimize power from the utility grid. This has two advantages. One is that the battery is charged and drained every day which prolongs and life of the battery. Secondly the grid power is used minimally only to cover up the shortage arising from the recycled light power. This reduces utility grid costs, carbon tax, reduces GHG emissions. Most importantly this embodiment provides power at lower cost to economically challenged communities and with least amount of environmental impact.

Figure 5:
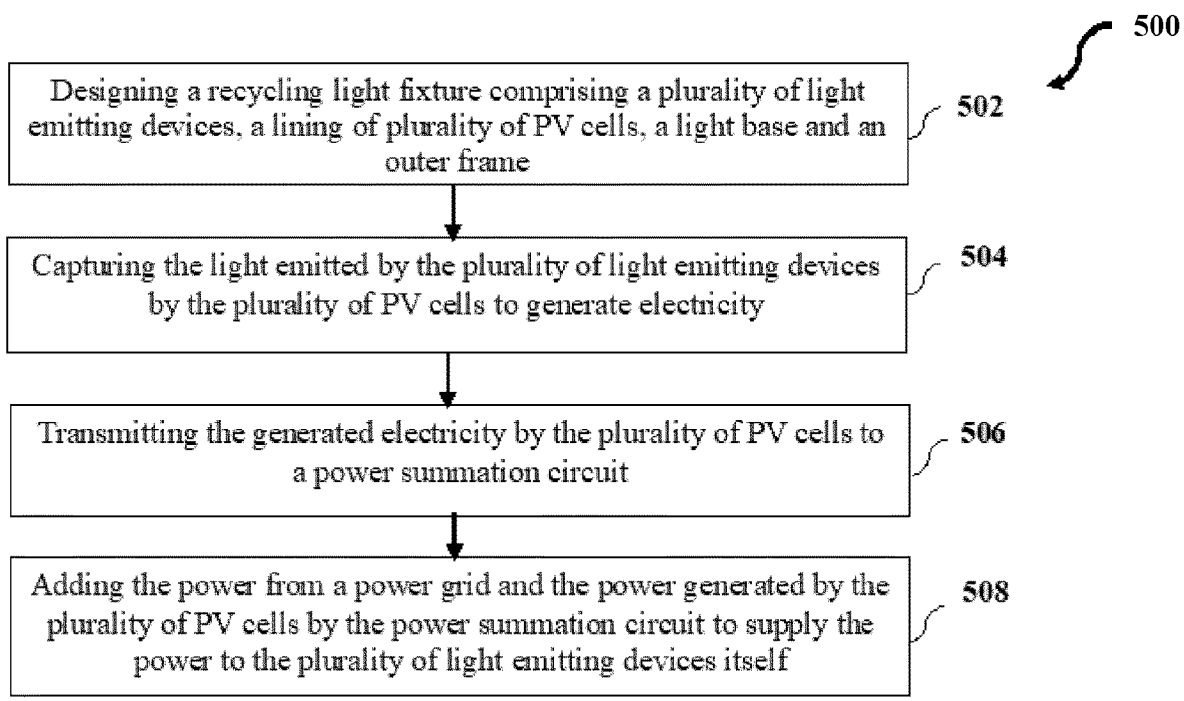
FIG. 5 illustrates a flowchart depicting a method for recycling light at home/store/commercial buildings and streetlight fixtures, according to an embodiment herein.
Figure 6:
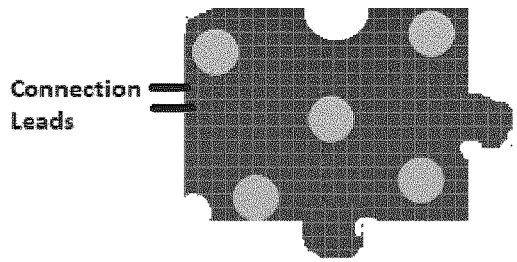
FIG. 6 shows the Lego or Jigsaw style integrated PV and LED structure with leads to connect to other similar integrated LEDs and PVs.

According to one embodiment herein, the FIG. 5 illustrates a flowchart depicting a method for recycling light at home/store/commercial buildings and streetlight fixtures, according to an embodiment herein. The method 500 comprises the steps of designing a recycling light fixture comprising a plurality of light emitting devices, a lining of plurality of PV cells, a light base, and an outer frame at step 502. The plurality of light emitting devices includes bulb or LED lamps. The method 500 further includes capturing the light emitted by the plurality of light emitting devices by the plurality of PV cells to generate electricity at step 504. Then the method 500 includes, sending the generated electricity by the plurality of PV cells to a power summation circuit at step 506 and adding the power from a power grid and the power generated by the plurality of PV cells by the power summation circuit to supply the power to the plurality of light emitting devices itself at step 508.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

While the disclosure is susceptible to various modifications and alternative forms, specific embodiment thereof has been shown by way of example in the drawings and as described in details above. It should be understood, however that it is not intended to limit the disclosure to the forms disclosed, but on the contrary, the disclosure is to cover all modifications, equivalents, and alternatives falling within the scope of the disclosure.

The embodiments herein disclose a system and method for recycling light at home/store/commercial buildings and streetlight fixtures to reduce power consumption and GHG emission, thereby reducing power and carbon tax bills. The biggest plus point is that the recycling light reduces environment impact of global warming and pollution. The recycling of light reduces the power consumption without compromising the quality and level of light illuminating an area. The recycling light can work with any environment.

The recycling of light is adopted in any geographical part of our planet regardless of the local power grid the voltage levels and AC cycle. The recycling of light is much more efficient as it is closer to the light source. The recycling light is more efficient because the recycling light uses only the unused light and does not in any way block the usable light. The recycling light fixture and circuit disclosed in the embodiments herein, is not susceptible to dust and other types of weather conditions because it is installed inside the fixture and away from human and other traffic. The recycling light circuit, the light embodiment and the fixture require minimal to no maintenance. The power produced is used in the same light fixture thereby avoiding transmission losses and reduces/eliminates the need for battery for storing power, charge leakage losses due to battery and battery degradation over time. The recycling of light invention as disclosed in the embodiments herein, provides a very efficient, environmentally friendly, and cost-effective solution. The recycling light is easy to maintain.

The recycling light is retrofitted in to almost all the existing fixtures and locations. The recycling light does not occupy additional space. In the system for recycling light, disclosed in the embodiments herein, most of the light falling on the PV cells is perpendicular there by providing maximum efficiency The microprocessor/Microcontroller IoT and data analytics continuously measures power consumption of every light fixture and the power generated from the recycled light. Based on above measurements, the power from recycled light minimizes power consumption from utility source and maximizes power consumption from recycled light. The recycling light works for any voltage type and cycles (Hz) used across the world.

In the system disclosed in the embodiments herein, some fixtures may just need retrofit into existing fixtures. The system is independent of the climate, geographical location, and the supply voltage.

In the system disclosed in the embodiments herein, uniquely invented light sources and PV cells produce maximum photovoltaic power (with best conversion efficiency). The uniquely integrated PV cells in the light fixtures itself provides maximum efficiency and all in one solution. The unique combination of PV cells inside the light fixture as well as installation of PV cells on top of furniture, shelves etc in the future can further help improve the quantum of recycled light and help in reducing the grid power bills, reduce carbon tax, reduce GHG emission and most importantly help improve the environment. The unique circuitry to use up the recycled light to feed the same light source eliminates transmission losses. The unique Lego style assembly helps to fit it into light fixtures of different shapes and sizes. Whenever required, the system 100 uses the capacitor instead of battery, to preserve charge more efficiently and which provides longer life at reduced cost.

In the system 100, a data sharing method can be used to share data between multiple light fixtures using power line communication. The unique design can be retrofitted to existing light fixtures. The unique design for streetlights, rearranging the LEDs helps to capture maximum light by PV cells while distributing the light further out on the ground below.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phrases or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for recycling light at home, store, commercial buildings, and street-light fixtures comprising:
   a. a recycling light fixture comprising:
      i. a plurality of light emitting devices configured to emit light in all directions;

ii. a lining of plurality of photovoltaic cells (PV cells) configured to capture the light emitted by the plurality of light emitting devices to generate electricity, and to power the plurality of light emitting devices itself, and wherein the lining of the plurality of photovoltaic cells are provided for the plurality of light emitting devices;

iii. a light base covered by an outer frame, and wherein the light base comprises the plurality of photovoltaic cells, and wherein the outer frame is configured to be designed with or without a protective dome cover;

b. a power summation circuit coupled to a power grid configured to receive a power generated by the plurality of photovoltaic cells embedded on the recycling light fixture, and wherein the power summation circuit adds a power from the power grid and the plurality of photovoltaic cells to supply the power to the plurality of light emitting devices itself thereby increasing the use of power generated by PV cells and reducing the power drawn or supplied from the grid;

c. a micro-processor/micro-controller based Internet of Things (IoT) configured for tracking a plurality of electrical parameters, and to determine total savings due to recycling of light;

wherein the plurality of electrical parameters include voltage and/or amperage;

wherein the micro-processor/micro-controller based IoT is further used to collect information, archive, and perform data analytics for accurate green-house gas (GHG) calculations, accurate monitoring of power consumption and the power generated from the recycled light fixture;

wherein the micro-processor/micro-controller based IoT is configured to gather data and perform data analysis;

wherein the data between different recycling light fixtures is shared using power line communication method;

wherein the power line communication method eliminates a need for Wi-Fi, thereby reducing communication related power consumption;

wherein the micro-processor/micro-controller based IoT is employed in the recycling light fixture of a residential building, commercial or in a street light is configured to monitor electrical parameters, GHG emissions and share data between different recycling light fixtures within the residential buildings, commercial buildings, and/or between street lights;

wherein the data between different residential buildings are shared community wise and data between different commercial buildings are shared within a section of a city or town;

wherein the data between different street lights are shared across communities, towns and cities;

wherein the data sharing and applying data analytics by the micro-processor/micro-controller based IoT identifies spots of high-power consumption and suggest ways to reduce power consumption;

wherein the micro-processor/micro-controller based IoT is further configured to improve efficiencies and monitor asset in terms of the plurality of light emitting devices and power generated by the plurality of PV cells;

wherein the recycling light fixture is configured to be retrofitted or fitted to the existing light fixtures in Lego style or Jigsaw style modular design as per the size, shape, and luminescence requirements;

wherein the plurality of light emitting devices are supplied/powered with the power generated by the recycling light fixture using the plurality of PV cells thereby eliminating a usage of battery;

wherein a capacitor is provided to hold an electrical charge instead of a battery, based on a need, when the plurality of PV cells generates power during daytime;

wherein the power summation circuit is configured to maximize the use of power from recycled light using from the plurality of PV cells and add only the remaining required quantity of power from the utility power grid, to minimize the cost of utility grid power, to reduce green-house gas (GHG) emissions, carbon tax, thereby reducing the impact on environment;

wherein the recycling power generated by the plurality of PV cells is used in the same recycling light fixture and is not transmitted anywhere else, thereby eliminating transmission losses; and, wherein the use of recycling power helps to eliminate a need for the batteries.

2. The system according to claim 1, wherein the plurality of light emitting devices includes bulb or LED lamps.

3. The system according to claim 1, wherein an amount of recycle power generated by the recycling light fixture with a protective dome cover is 29%, and wherein an amount of recycle power generated by the recycling light fixture without a protective dome cover is 18.3%.

4. The system according to claim 1, wherein the light fixing model further comprises the plurality of light emitting devices, the plurality of PV cells and the power summation circuit, integrated within the recycling light fixture;

wherein the plurality of PV cells is configured to capture light from the plurality of light emitting devices and to feed or supply the power generated to the power summation circuit; and, wherein the power summation circuit adds the power from the utility power grid and the plurality of photovoltaic cells, to supply power to the same plurality of light emitting devices of the home recycling light fixture model itself.

5. The system according to claim 1, wherein the power consumption for the home recycling light fixture model is 18 Watts and the power harvested from the recycling light fixture is the range of 18% to 29%.

6. The system according to claim 1, further comprises an office or store or commercial building recycling light fixture model installed with the plurality of light emitting devices, the plurality of PV cells and the power summation circuit;

wherein the plurality of PV cells is configured to capture light from the plurality of light emitting devices, generate electricity and to send the generated electricity to the power summation circuit;

wherein the power summation circuit adds the power from the utility power grid and the plurality of PV cells, to supply power to the same plurality of light emitting devices of the office or store or commercial building recycling light fixture itself;

wherein the power consumption for the office or store or commercial building recycling light fixture model is 32 Watts and the power harvested from the recycling light fixture is the range of 15% to 25%.

7. The system according to claim 1, further comprises a streetlight recycling light fixture model provided with the plurality of light emitting devices, the plurality of PV cells integrated within the recycling fixture, a combination of solar panel, a battery and the power summation circuit;
    wherein the plurality of PV cells is configured to capture light from the plurality of light emitting devices, generate electricity and to send the generated electricity to the power summation circuit;
    wherein the solar panel is configured to capture the light from solar light and from ambient light sources, and to send the power generated by the solar panel to the power summation circuit;
    wherein the power summation circuit adds the power from the power grid, the solar panel and the plurality of recycled light from the PV cells to supply power to the same plurality of light emitting devices of the street light recycling light fixture itself;
    wherein the battery is charged by the solar panel and the PV cells within the lighting fixture during the daytime;
    wherein the power consumption for the street light recycling light fixture depends on the type of streetlight used and is 50 Watts and the power harvested from the recycled light fixture, along with the solar panel is the range of 10% to 18%;
    wherein the power harvested percentages vary based on the geographical locations of the solar panel and the arrangement of the plurality of PV cells inside the recycle light fixture;
    wherein the solar panel for the street light recycling light fixture model are mounted at an angle, to prevent accumulation of dust, moisture, and snow, thereby making the street light recycling light fixture model suitable for installation at different geographical locations without any additional modifications;
    wherein the plurality of light emitting devices and the PV cells within the street light recycling light fixture are arranged in such a way that the plurality of PV cells get maximum exposure to the light emitted by the plurality of light emitting devices;
    wherein the plurality of PV cells are arranged in a triangular manner, which helps spread the light to the larger areas.

8. A method for recycling light at home, store, commercial buildings, and street-light fixtures comprising the steps of:
    a. designing a recycling light fixture comprising a plurality of light emitting devices, a lining of plurality of photovoltaic cells (PV cells), a light base, an outer frame; and wherein the recycling light fixture is configured to be designed with or without a protective dome cover;
    b. capturing the light emitted by the plurality of light emitting devices by the plurality of PV cells within the lighting fixture to generate electricity;
    c. adding the generated electricity by the plurality of PV cells to a power summation circuit;
    d. adding the power from a utility power grid, to supply the power to the plurality of light emitting devices itself; and,
    e. providing a micro-processor/micro-controller based IoT (Internet of Things) configured for tracking a plurality of electrical parameters, and to determine the total savings due to recycling of light;
        wherein the plurality of electrical parameters include voltage and/or amperage;
        wherein the micro-processor/micro-controller based IoT is further used to collect information, archive and perform data analytics for accurate green-house gas (GHG) calculations, accurate monitoring of power consumption and the power generated from the recycled light fixture;
        wherein the micro-processor/micro-controller based IoT is configured to gather data and perform data analysis;
        wherein the data between different recycling light fixtures is shared using power line communication method;
        wherein the power line communication method eliminates the need for Wi-Fi, thereby reducing communication related power consumption;
        wherein the micro-processor/micro-controller based IoT is configured to employ data analytics in the recycling light fixture of a residential building, commercial or in a street light to monitor electrical parameters, GHG emissions and share data between different recycling light fixtures within the residential buildings, commercial buildings, and/or between street lights;
        wherein the data between different residential buildings are shared community wise and data between different commercial buildings are shared within a section of a city or town;
        wherein the data between different street lights are shared across communities, towns and cities;
        wherein the data sharing and applying data analytics by the micro-processor/micro-controller based IoT helps to identify spots of high-power consumption and suggest ways to reduce power consumption;
        wherein the micro-processor/micro-controller based IoT is further configured to improve efficiencies and monitor asset in terms of the plurality of light emitting devices and the power generated from the recycled light, using the plurality of PV cells;
        wherein the recycling light fixture helps to utilize unused light emitted by the plurality of light emitting devices, which is recycled and reduces the power consumption from the power grid;
        wherein all power generated by the recycling light fixture using the plurality of PV cells, is utilized completely to power the plurality of light emitting devices itself thereby eliminating a need for a battery;
        wherein a capacitor is provided to hold the charge, when there is a need, while the plurality of PV cells generates power during daytime;
        wherein the power summation circuit is configured to maximize the use of power generated by the recycled light from the plurality of PV cells within the fixture and add required quantity of power from the utility power grid, to minimize the cost of grid power, to reduce green-house gas (GHG) emissions, carbon tax, thereby reducing the impact on environment;
        wherein the power generated by the plurality of PV cells is used in the same recycling light fixture and is not transmitted anywhere else, thereby eliminating transmission losses.

9. The method according to claim 8, wherein the plurality of light emitting devices includes bulb or LED lamps.

10. The method according to claim 8, wherein an amount of recycle power generated by the recycling light fixture with a protective dome cover is 29%;
    wherein an amount of recycle power generated by the recycling light fixture without a protective dome cover is 18.3%.

11. The method according to claim 8, further recycling light for a home light fixture model by:
- f. capturing the light emitted by the plurality of light emitting devices, through the plurality of PV cells;
- g. generating power by the plurality of PV cells;
- h. sending the power generated by the plurality of PV cells to the power summation circuit; and,
- i. adding the power from the utility power grid and, to supply the power to the same plurality of light emitting devices of the home recycling light fixture itself;
    - wherein a power consumption for the home recycling light fixture model is 18 Watts and a power harvested from the recycling light fixture is the range of 18% to 29%.

12. The method according to claim 8, further recycling light in a light fixture model for an office or store or commercial building by:
- f. capturing light emitted by the plurality of light emitting devices, through the plurality of PV cells;
- g. generating power by the plurality of PV cells;
- h. sending the power generated by the plurality of PV cells to the power summation circuit; and,
- i. adding the power from the utility power grid and the power generated by the plurality of PV cells by the power summation circuit, to supply the power to the same plurality of light emitting devices of the office or store or commercial building recycling light fixture itself;
    - wherein the power consumption for the office or store or commercial building recycling light fixture model is 32 Watts and the power harvested from the recycling light fixture is the range of 15% to 25%.

13. The method according to claim 8, further comprises recycling a light in a streetlight recycling light fixture model by:
- f. capturing the light emitted by the plurality of light emitting devices, through the plurality of PV cells;
- g. capturing the light emitted from solar light and from ambient light sources through a solar panel;
- h. generating power by the plurality of PV cells and the solar panel;
- i. sending the power generated by the plurality of PV cells and the solar panel to the power summation circuit; and,
- j. adding the power from the utility power grid, the solar panel, and the plurality of PV cells by the power summation circuit, to supply the power to the same plurality of light emitting devices of the streetlight recycling light fixture itself;
    - wherein the PV cells and LEDs are designed in triangular manner/shape to maximize recycling of the light and spreading the light to illuminate larger area;
    - wherein the power consumption for the streetlight recycling light fixture model depends on the type of streetlight used;
    - wherein the power consumption for the streetlight recycling light fixture is 50 Watts;
    - wherein the power harvested from the recycled light fixture and the solar panel is the range of 10% to 18%;
    - wherein the power harvested percentages vary based on the geographical locations of the solar panel and the arrangement of the plurality of PV cells inside the recycle light fixture.

* * * * *